United States Patent [19]
Suda et al.

[11] Patent Number: 6,050,495
[45] Date of Patent: Apr. 18, 2000

[54] BOTTOM BYPASS STRUCTURE OF THERMOSTAT DEVICE

[75] Inventors: Hiroshi Suda; Shozo Ueno, both of Kiyose, Japan

[73] Assignee: Nippon Thermostat Co., Ltd., Kiyose, Japan

[21] Appl. No.: 09/121,843

[22] Filed: Jul. 24, 1998

[30] Foreign Application Priority Data

Apr. 1, 1998 [JP] Japan .................................. 10-087851

[51] Int. Cl.[7] ...................................................... F01P 7/16
[52] U.S. Cl. ........................................ 236/34.5; 123/41.09
[58] Field of Search .................... 236/34, 34.5; 123/41.1, 123/41.08, 41.09

[56] References Cited

U.S. PATENT DOCUMENTS

| | | | |
|---|---|---|---|
| 2,052,313 | 8/1936 | Payne | 236/34.5 |
| 2,701,102 | 2/1955 | Albrecht | 236/34.5 |
| 3,562,784 | 2/1971 | Lipscombe | 236/34.5 |

FOREIGN PATENT DOCUMENTS

| | | | |
|---|---|---|---|
| 866792 | 8/1957 | United Kingdom | 236/34.5 |

*Primary Examiner*—William E. Tapolcai
*Attorney, Agent, or Firm*—Oblon, Spivak, McClelland, Maier & Neustadt, P.C.

[57] ABSTRACT

An object of the present invention is to provide a bottom bypass structure of a thermostat device enabling it possible to stably operate a valve element, to prevent overshooting and hunting and to reduce in sizing of the thermostat device. The structure to form a bypass channel to bypass a circulating fluid in the lower reaches of the valve element opening and closing the circulation channel.

2 Claims, 7 Drawing Sheets

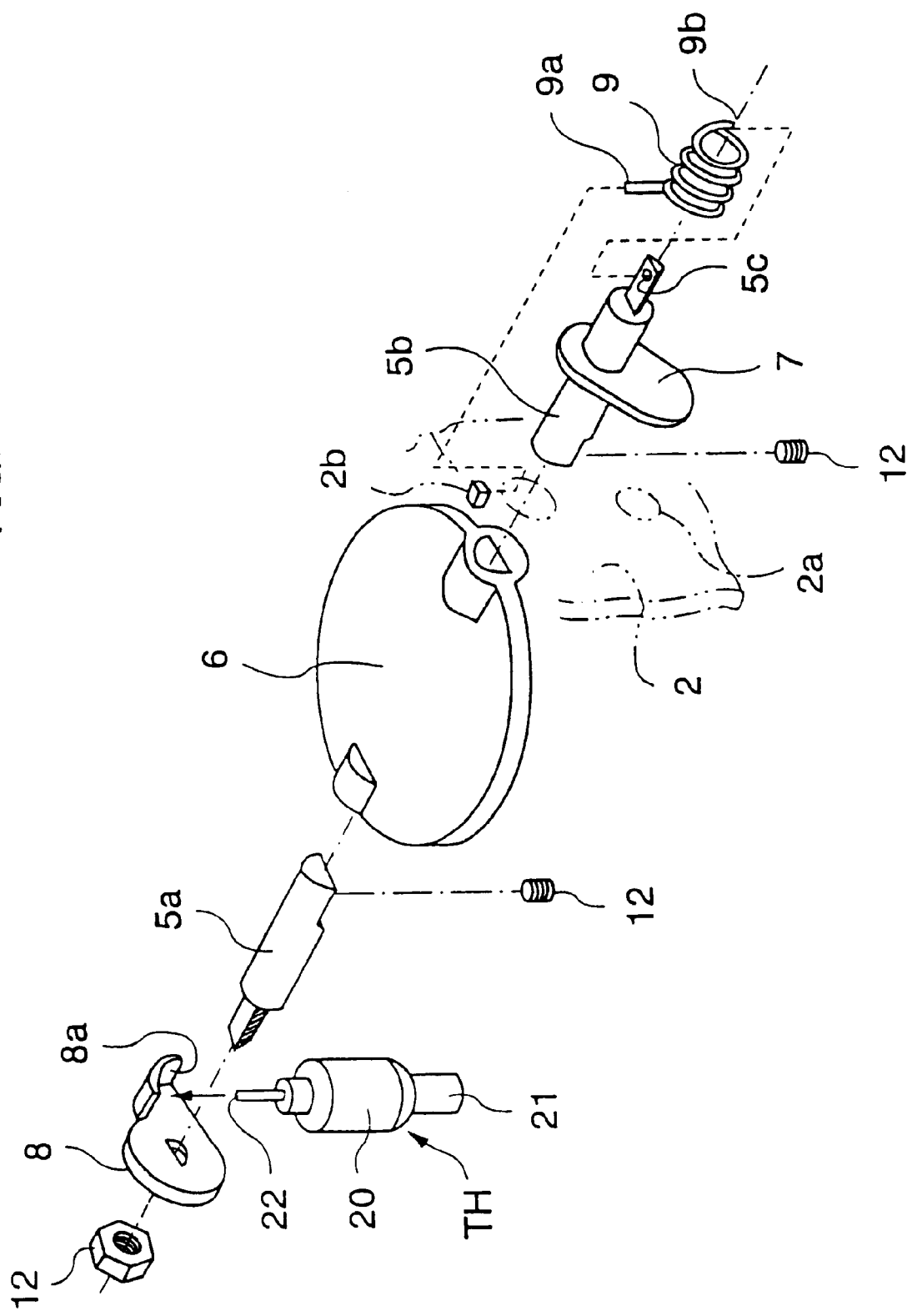

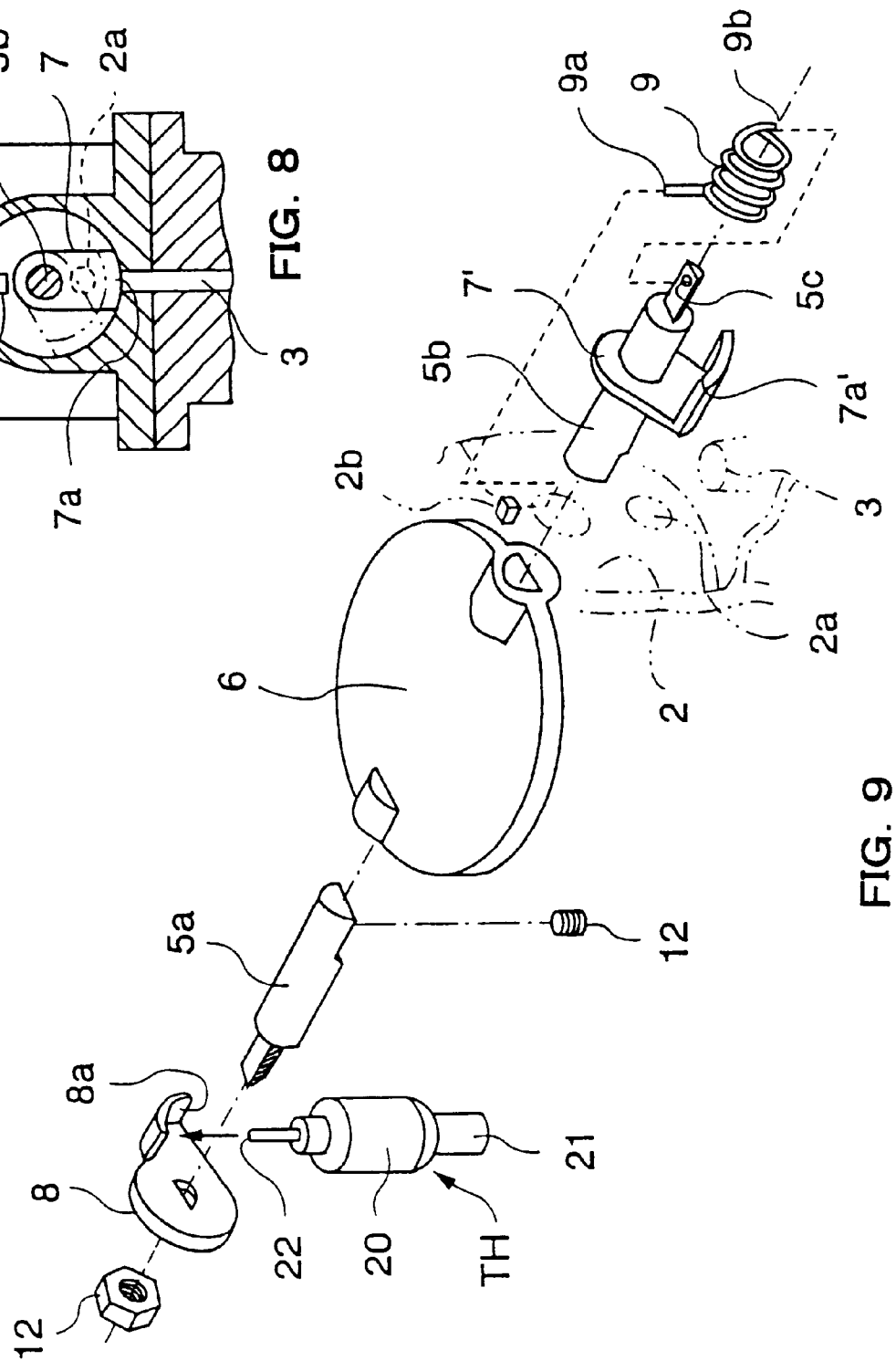

BOTTOM BYPASS STRUCTURE OF THERMOSTAT DEVICE

BACKGROUND OF THE INVENTION

1. Field of the Invention

The present invention relates to a thermostat device controlled by a valve element having a valve shaft, especially to a bottom bypass structure of the thermostat device which has a bypass channel provided in the lower reaches side of the valve element disposed in a circulation channel of fluid, allowing the fluid to bypass to the lower reaches side of the circulation channel in accordance with an opening and closing situation of the valve element, and a switch valve to open and close the bypass channel.

2. Description of the Related Art

Generally, a thermostat device disposed in a cooling system for an engine and the like, has a sensor case embedding a heat expansion element which expands and shrinks when sensing the temperature change of coolant filled in a circulation channel of the cooling system, and has the function of maintaining the coolant at a predetermined temperature through opening and closing of the valve caused by volume changes through expansion and shrinkage of the heat expansion element.

A poppet type thermostat device having a bypass valve as shown in FIGS. 10 and 11 is an example of a commonly used thermostat device. This thermostat device 1A is a thermostat which has a first valve element 6' and a second valve element 23 (bypass valve). While the coolant in the circulation channel 4 is blocked by closing the first valve element 6' when the coolant is at a low temperature during warming up of an engine E or the like (refer to FIG. 10, the coolant is circulated toward an inlet side of the engine E through a bypass channel 3 from an outlet side of the engine E by opening the second valve element 23 (bypass valve).

When the coolant is warmed up to temperatures exceeding a predetermined temperature, a heat expansion element of a sensor case 21' opens the first valve element 6' through a piston rod 22' so that the circulation channel 4 of the coolant is opened and the heat expansion element closes the second valve element 23 (bypass valve) to block the bypass channel 3.

The thermostat device 1A having the above functions can be disposed at an inlet side or an outlet side of an engine in the cooling channel 4, but it is not used only for cooling an engine in high temperatures and the like. And when considered environmental matters such as an emission or fuel efficiency, and relation to other parts having another temperature sensing function, from a standpoint of maintaining an accurate water temperature of the coolant and correspondence to a rapid change of the water temperature, it is more popular to be disposed at the inlet side shown in FIGS. 5.

When the thermostat device 1A is disposed at the inlet side of an engine and the like, that is, at a place where the coolant coming from the engine E through the bypass channel 3 and the coolant coming from a radiator R are mixed, as compared with the effect in the case of disposing at the outlet side, it has the effect that the range of the water temperature hunting becomes smaller because of mixing of the coolants, and a pressure difference fluctuation becomes small due to the balance between the bypass channel 3 and the radiator R.

When the thermostat device 1A reaches a predetermined lift, since the second valve element 23 (bypass valve) blocks the bypass channel 3 and causes all the coolant to flow to the radiator R, it becomes possible to improve the radiation characteristic of the radiator R, which results in an advantage for the temperature control of an air conditioner.

In the above described conventional poppet type thermostat device 1A, since the first valve element 6' and the second valve element 23 (bypass valve) are disposed in the circulation channel 4, and a piston rod 22' to drive these valve elements 6', 23 (bypass valve) is always kept in the coolant, according to circumstances, the coolant penetrates into the piston rod 22' and the piston guide 19, which has an adverse influence on the sliding function.

Some ingredients in the coolant may sometimes corrode the structural members and impair the functions. If this happens, a smooth passage of the coolant through the circulation channel 4 or the bypass channel 3 can not be expected and moreover it may have a serious effect on the driving of the engine E.

Besides, since the sensor case 21' which serves as a sensing portion of the coolant, the first valve element 6' which is a sliding portion, and the second valve element 23 (bypass valve) are disposed in the circulation channel 4, the flow resistance of the coolant is enlarged. Therefore in order to obtain a predetermined flow amount, an increase of the valve diameter of the first valve element 6' is required, which disturbs a size reduction of the thermostat device 1A itself.

Further, the coolant flows into the thermostat device 1A from different directions of the circulation channel 4 and the bypass channel 3, and the sensor case 21' which serves as a sensing portion is not hit by the coolant which is a mixture of the coolant flowing in from both direction. Consequently, the temperature of the coolant can not be accurately sensed in some circumstances.

In a thermostat device which has the function of forcibly opening the valve element 6 by heat-expansion of wax in a sensor case using a heating device, when trouble such as leakage of the coolant or breaking of shield wire happens, it results in a disadvantage in handling control due to the difficulty in replacement.

As a substitute for the above described poppet type thermostat device 1A, there is a thermostat device 1B having a mechanism which has a valve element to block the circulation channel 4 and a detecting portion to detect the temperature of a fluid in the circulation channel 4 and has a mechanism in which a driving mechanism to drive the valve element around the valve shaft is disposed outside the circulation channel 4 as shown in FIG. 13 (refer to Japanese Utility Model Laid-open No. Hei 2-145623).

In the thermostat device 1B, it may be possible to protect functional components from coolant or to control the flow amount to some extent in accordance with a required flow amount by increasing the valve diameter, however, from the structure of the valve element 6', that is, since the valve element to control the flow amount is only one, it is difficult to accurately control the flow amount of the bypass channel 3 and the flow amount of the circulation channel 4.

Therefore, similar to the poppet type thermostat device 1A explained hereinbefore, functions such as a reduction of the pressure difference fluctuation by taking the balance between the bypass channel 3 and the radiator R, and prevention of the water temperature hunting, can not be fully effected.

A bottom bypass structure of the thermostat device relating to the present invention is developed in consideration of these disadvantages and the object of the invention is to provide the following bottom bypass structure of a thermostat device.

In the thermostat device having a valve element with a valve shaft, a bottom bypass structure of a thermostat device which can materialize a stable action of the valve element, prevent from over shooting and hunting, and can reduce in size of the thermostat device itself.

SUMMARY OF THE INVENTION

In order to solve the above described disadvantages, the bottom bypass structure of a thermostat device of the present invention embeds a heat expansion element to expand and shrink upon sensing the temperature change of a circulating fluid in a circulation channel in a case member in which the circulation channel is formed, a thermo-element allowing a slide member to slide in accordance with the expansion and the shrinkage of the heat expansion element, a valve element to be rotatably supported with a valve shaft in the circulation channel, and in the thermostat device to control the flow rate of the circulating fluid by turning the valve shaft in accordance with the sliding of the thermo-element and opening to open and close the valve element, the thermostat device has a structure to form a bypass channel to bypass the circulating fluid on the lower reaches of the valve element which opens and closes the circulation channel.

It is preferable to have in the structure a second valve element to open and close the aforementioned bypass channel in accordance with the opening-closing movement of the valve supported by a valve shaft of the valve element and having this valve shaft.

BRIEF DESCRIPTION OF THE DRAWINGS

FIG. 1 is a front view, FIG. 2 is a cross sectional view taken along the A—A line in FIG. 1, FIG. 2 is a fragmentary cutaway rear elevation view taken along B—B line in FIG. 2;

FIG. 4 is a front view, FIG. 2 (*b*) is a cross sectional view taken along the A—A line in FIG. 4, FIG. 6 is a fragmentary cutaway rear elevation view taken along B—B line in FIG. 5;

FIG. 7 is a perspective view explaining a link of the valve element and a second valve element;

FIGS. 8 and 9 are perspective views explaining another embodiment of the valve element and the second valve element

DESCRIPTION OF THE PREFERRED EMBODIMENT(S)

Embodiments of a bottom bypass structure of a thermostat device relating to the present invention having this sort of structure will be explained with reference to the attached drawings.

Figure 3:
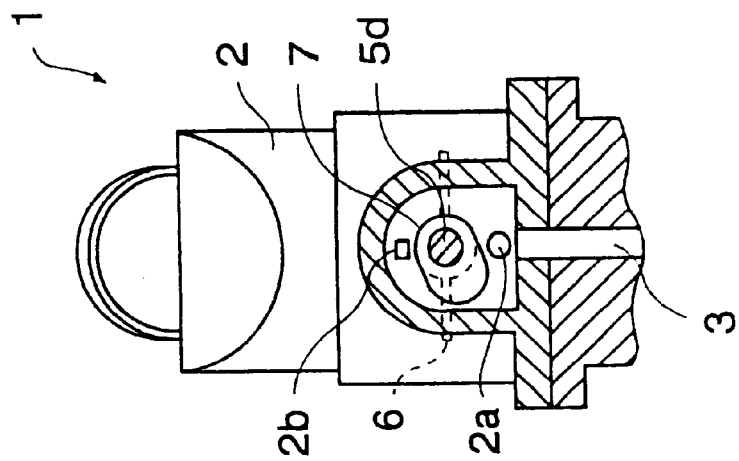
FIGS. 1–3 show an embodiment of a thermostat device relating to the present invention, and show explanatory views of the thermostat device disposed in a circulation channel 4 of an engine E when the valve is closed.
Figure 2:
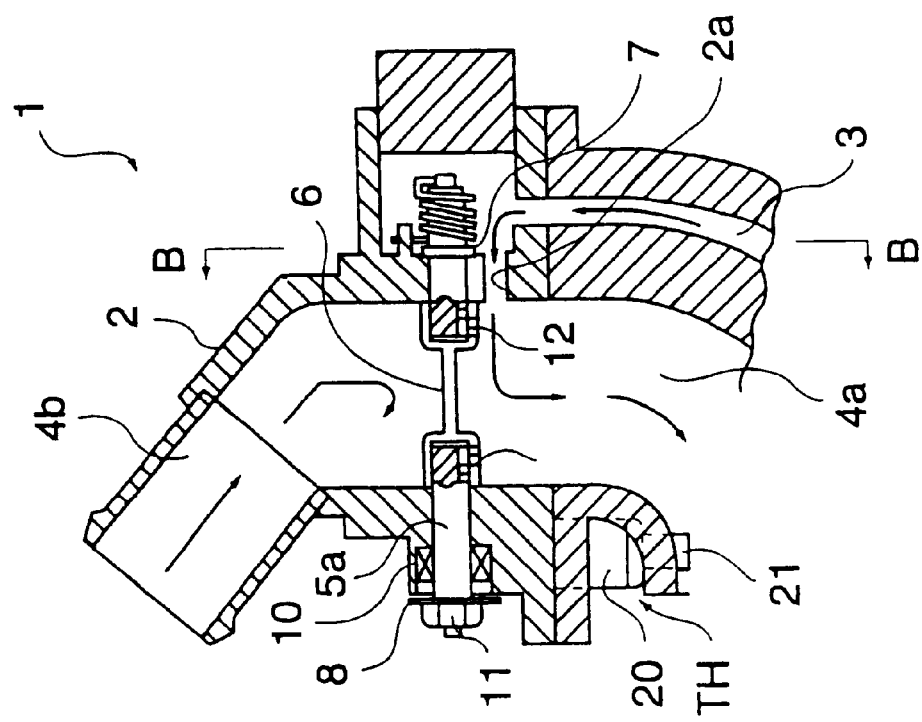
Figure 1:
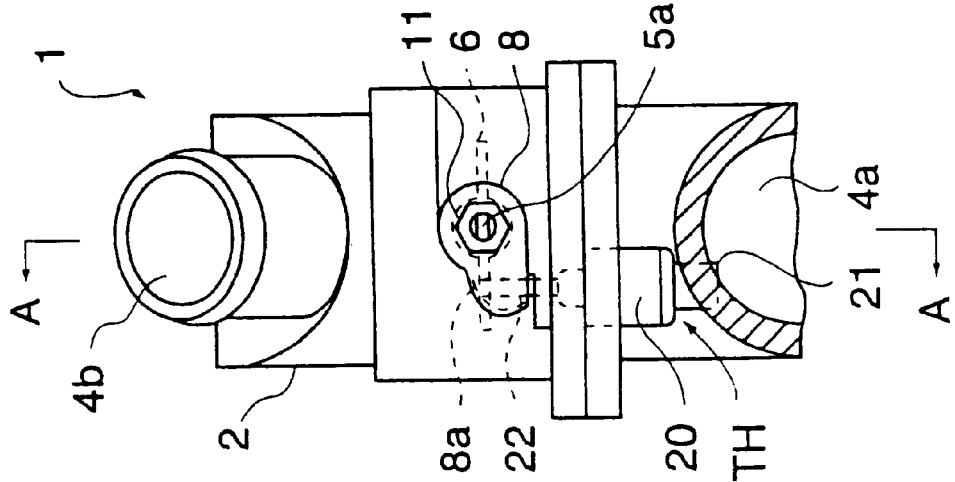
Figure 6:
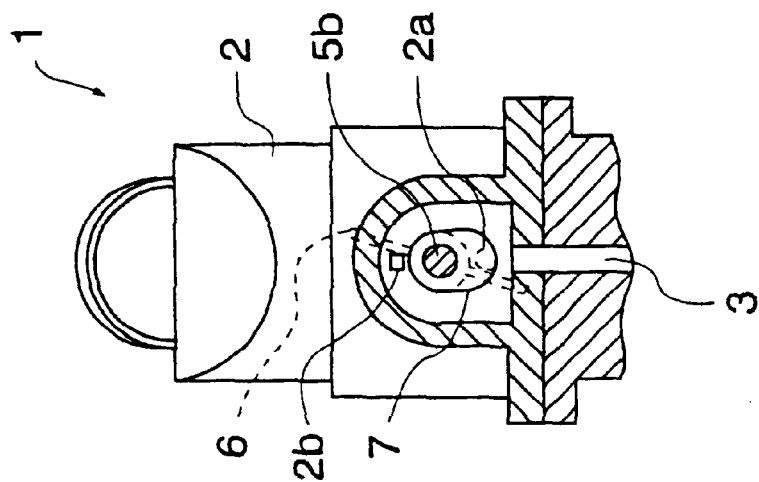
FIGS. 4–6 show the thermostat device in FIGS. 1–3 when the valve is open.
Figure 5:
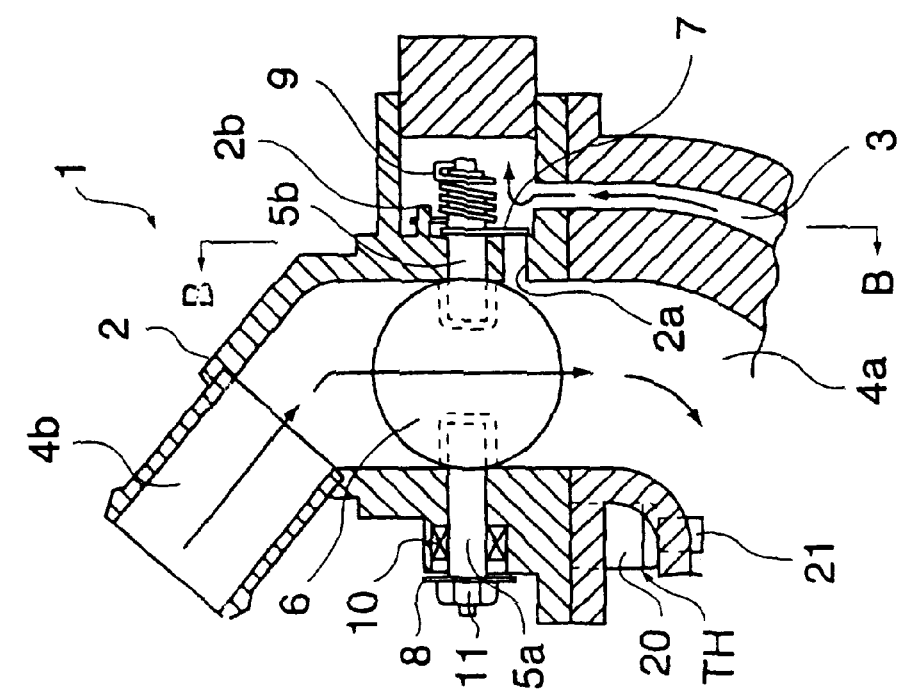
Figure 4:
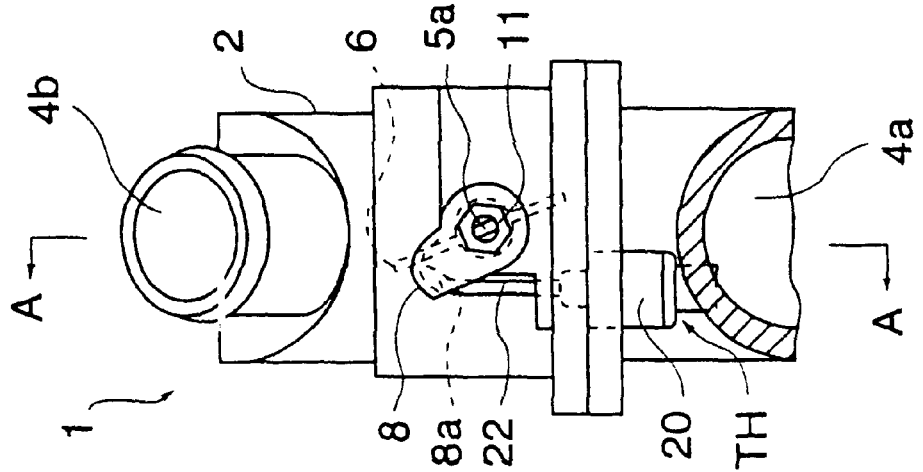
Figure 10:
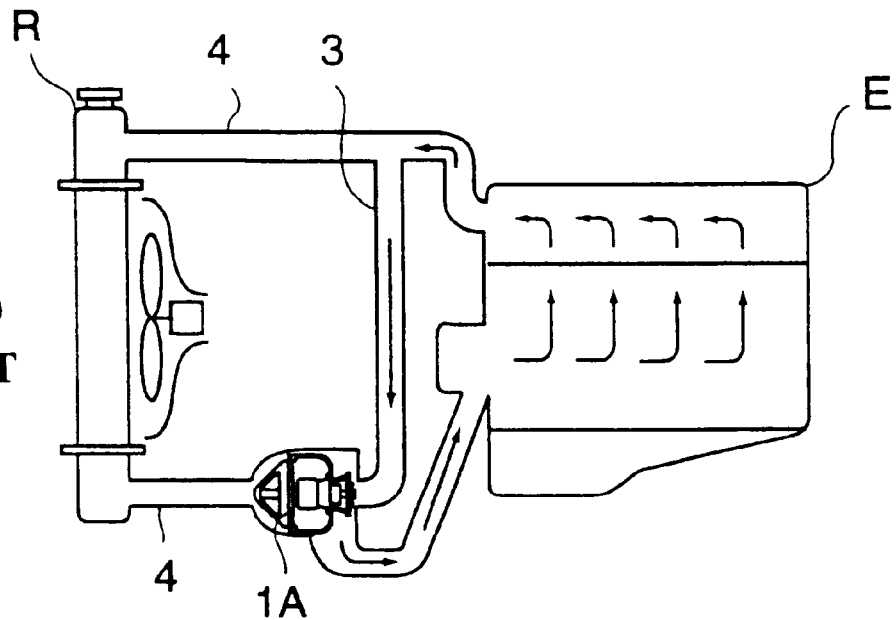
FIGS. 10 and 11 are explanatory views of a bypass channel side by side with a circulation channel.
Figure 11:
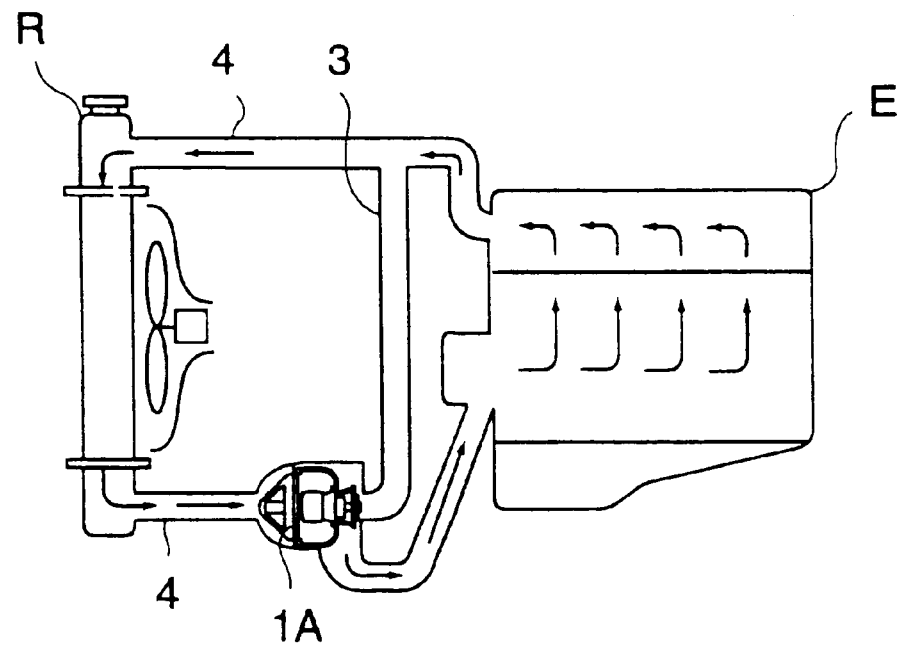
Figure 12:
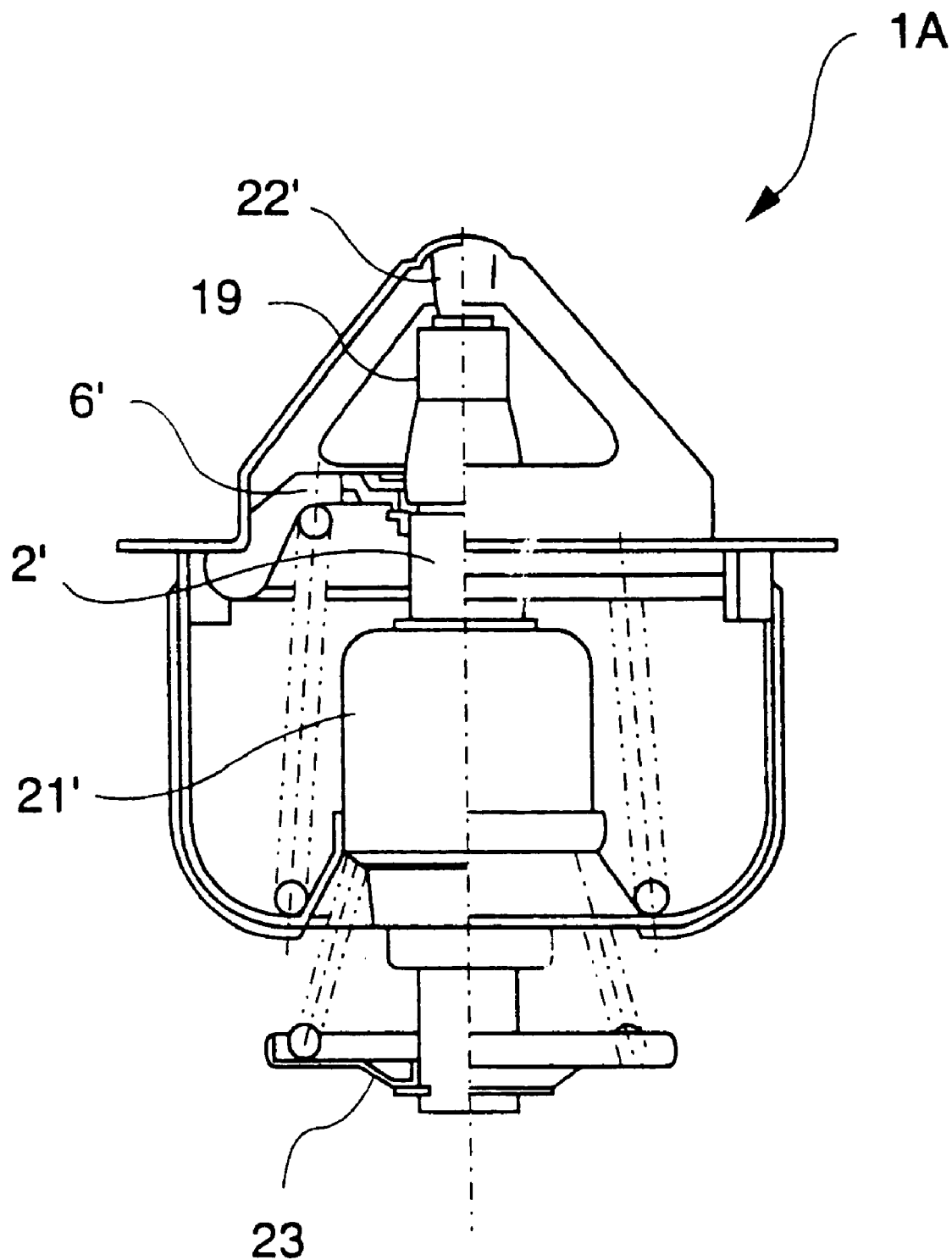
FIG. 12 is a cross sectional view of a poppet type thermostat device having a conventional bypass structure.
Figure 13:
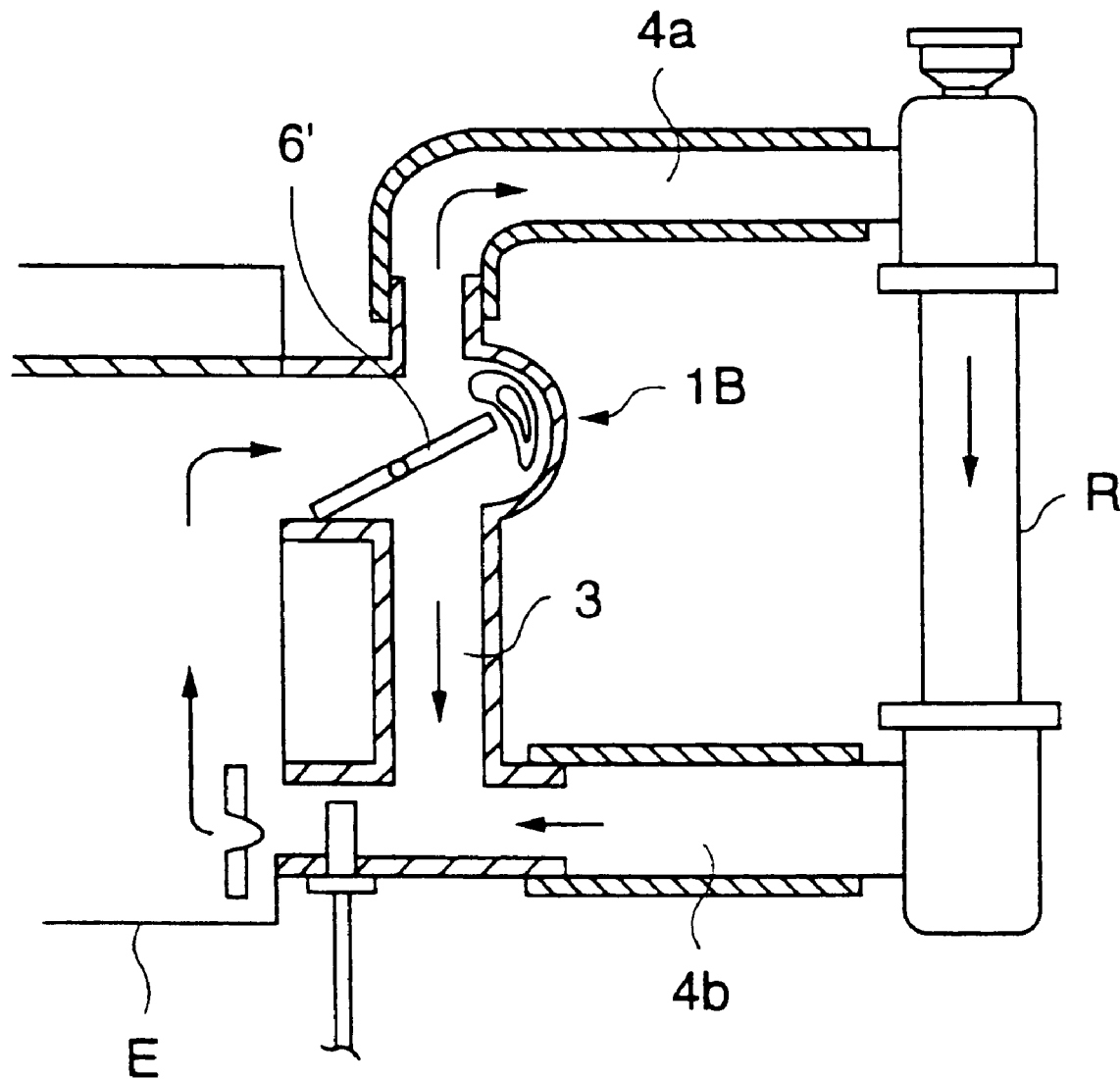
FIG. 13 is a layout diagram of a thermostat device having a mechanism to dispose a driving mechanism to drive the valve element by the valve shaft in the outside of the circulation channel.

FIGS. 1–3 show the embodiment of the bypass structure of the thermostat device relating to the present invention, showing an explanatory view of the thermostat device disposed in a circulation channel 4 of an engine E when a valve is closed. FIG. 1 is a front view, FIG. 2 is a cross sectional view taken along the A—A line in FIG. 1, and FIG. 3 is a fragmentary cutaway rear elevation view taken along B—B line in FIG. 2. FIGS. 4–6 are explanatory views of the thermostat device in FIGS. 1–3 when the valve is open. FIG. 4 is a front view, FIG. 5 is a cross sectional view taken along the A—A line in FIG. 4, and FIG. 6 is a fragmentary cutaway rear elevation view taken along B—B line in FIG. 5. FIG. 7 is a perspective view explaining a link of the valve element and the second valve element, and FIGS. 8–10 are perspective views explaining another embodiment of a valve element and a second valve element.

The thermostat device 1 shown in FIGS. 1–3 and FIGS. 4–6 embeds a heat expansion element which expands and shrinks upon sensing the temperature change of a coolant in a circulation channel 4*a* in a case member 2 which forms a circulation channel 4 (4*a*, 4*b*) for a coolant in the inside, and has the thermo-element TH sliding a slide member in accordance with a volume change by expansion and shrinkage of the heat expansion element, and a slide valve element 6 which is a first valve element rotatably supported by a valve shaft 5 (torque shaft 5*a*, supporting shaft 5*b*) in the circulation channel. The thermostat device 1 turns the valve shaft 5 (torque shaft 5*a*, supporting shaft 5*b*) in accordance with a sliding movement of the thermo-element TH and controls the flow rate from the upper reaches (upper side 4*b*) to the lower reaches (bottom side 4*a*) of a slide valve element 6 of the circulation channel 4 of the coolant in accordance with opening and closing of the slide valve 6.

In the embodiment, a bypass channel 3 circulating the coolant from the bottom side 4*a* in the lower reaches of the slide valve 6 of the circulation channel 4, as shown in FIGS. 1–3 and FIGS. 4–6, when the bottom side 4*a* and the upper side 4*b* of the circulation channel 4 is closed by the slide valve element 6, is formed in the case member 2. A bored hole 2*a* which serves as an inlet of the coolant in the bypass channel 3 is formed in the inner face of the bottom side 4*a* of the circulation channel 4.

On the supporting shaft 5*b* supporting the slide valve element 6, a bypass valve 7 is supported with the shaft thereof which is a second valve element to close the aforementioned bypass channel 3 when the slide valve element 6 is in an open state, and to open the aforementioned bypass channel 3 when the slide valve element 6 is in a closed state.

The thermostat device 1 having this sort of formation will be briefly explained here.

The heat expansion element, or wax which expands and shrinks upon sensing the heating or cooling of the coolant is embedded in a sensor case 21 of the thermo-element TH (not shown). A piston rod 22 which is a sliding member slides in accordance with a volume change by expansion and shrinkage of the wax, and a rotary opening and closing of the slide valve element 6 is conducted by the sliding movement.

The sensor case 21 is disposed in the bottom side 4*a* of the slide valve element 6 in the circulation channel 4 of the coolant, and the piston rod 22 is disposed in the outside of the circulation channel 4.

The slide valve element 6 is rotatably supported by the torque shaft 5*a* and the supporting shaft 5*b*, and also disposed in a manner that it can open and close the circulation channel 4 by the turning movement of the torque shaft 5*a* and is a slide type valve element having a function to control the flow rate of the coolant.

A top portion of the piston rod 22 abuts the abutting surface 8*a* of a cam member 8 fitted to the torque shaft 5*a* of the slide valve element 6. Since the piston rod 22 abuts along the abutting surface 8a when the piston rod 22 slides, the cam member 8 turns the torque shaft 5a.

Note that, the slide valve element 6 explained in the present embodiment is explained as being a slide type valve element, but any valve such as a rotary valve, ball valve, or shutter valve which turns the valve element around the valve shaft and controls the flow rate of the circulating fluid such as coolant and the like can be used, and the selection of the valve can be determined from consideration of the conditions such as the circulation channel 4 in which the slide valve is disposed, flow rate and so forth.

The slide type valve element 6 will be explained here.

The slide type valve element 6 according to the present embodiment shown in FIG. 7 and FIGS. 8–9 served for circulation cooling of the water cooled engine E, is disposed in the circulation channel 4 of the coolant, and uses the sensor case 21 having the piston rod 22 as a source of torque driving.

The valve element 6 rotatably supported a torque shaft 5a and a supporting shaft 5b, protruding in the direction of the diameter of a circular shown in the drawing in the case member 2, and serves as a flow rate control valve to control the flow amount of the coolant passing through the circulation channel 4 by the above rotary opening and closing of the slide valve 6.

The torque shaft 5a and the supporting shaft 5b protruding toward the case member 2 from the center of the slide valve element 6 are screwed with bolts 12 respectively and rotatably support the slide valve 6 to the case member 2.

Next, the thermo-element TH which is a driving source of the slide type slide valve element 6 thus formed, and the movement of the slide valve element 6 by the thermo-element TH will be explained.

The thermo-element TH shown in FIGS. 1–3 and FIGS. 4–6 has a structure that it causes the wax (not shown) which is embedded in the sensor case 21 as a temperature sensing portion to expand and shrink, and pushes up a diaphragm (not shown) to slide the piston rod 22.

The top portion of the piston rod 22 is disposed to abut the cam member 8 supported by the torque shaft 5a of the valve shaft 5 as shown in FIG. 7 and FIGS. 8 and 9.

Since the other top portion of the torque shaft 5a is fixed to the slide valve element 6, when the aforementioned piston rod 22 slides, the top portion of the piston rod 22 turns the cam member 8 so as to turn the slide valve element 6 through the turning movement of the cam member 8.

On the supporting shaft 5b supporting the slide valve element 6, a spring 9 of which one end portion is fixed at a fixing portion 2b of the case member 2 and the other end portion is fixed in a spring fixing groove 5c formed on the supporting shaft 5b is wound. The spring 9 is wound to bias the slide valve element 6 to turn in the opening direction by the expansion of the piston rod 22 of the thermo-element TH, in the closing direction.

The bypass valve 7 supported by the supporting shaft 5b will be explained next.

The bypass valve 7, which is supported by the supporting shaft 5b, is a mechanism to open and close in response to opening and closing of the slide valve element 6. When the slide valve element 6 is put in the closing state, the bored hole 2a bored on the case member 2 is opened, and when the slide valve element 6 is in the opening state, the bored hole is supported in a state to close.

Supported the bypass valve 7 by the supporting shaft 5b, the slide valve element 6 is put in a closing state and the bored hole 2a is opened when warming up the engine E, causing the coolant to bypass the bypass channel 3. The coolant is thus allowed to bypass the bypass channel 3 and the warming up of the engine comes to an end, and the coolant sufficiently gets warm. Then, when the piston rod 22 makes the slide valve element 6 in the opening state, caused by the expansion of the wax in the sensor case, the coolant from the bypass channel 3 and the coolant from the radiator R are mixed at the inlet side of the engine E, so that the width of the water temperature hunting narrows. And in addition, the pressure difference fluctuation becomes small due to the balance of the bypass channel 3 and the radiator R, thereby preventing overshooting and the hunting, resulting in the stable supply of the coolant.

A flow complete sequence of the coolant according to the bottom bypass structure of the thermostat device will be explained.

Immediately after starting the engine when the coolant temperature is still low. Upon sensing the temperature of the coolant, the wax in the sensor case 21 disposed in the circulation channel 4 connected to the thermostat device 1 is in shrunk state so that the slide valve element 6 is in the closed state due to the propelling force of the spring 9 to cause the circulation channel 4 to be in the closed state. Accordingly, the bypass valve 7 supported by the supporting shaft 5b of the slide valve element 6 opens the hole 2 bored on the inside wall of the bottom side 4a of the circulation 4, and allows the coolant to bypass the circulation channel 4 from the bypass channel 3. When the coolant gradually gets warm, the wax in the sensor case 21 expands according to the temperature rise of the coolant. Upon expansion of the wax, it extends the piston rod 22 through the diaphragm.

When the piston rod 22 opens the slide valve element 6, caused by the expansion of the wax of the sensor case 21, and the bypass valve 7 closes the bored hole 2a to gradually make the bypass channel 3 in the closed state, the coolant from the bypass channel 3 and the coolant from the radiator R are mixed at the inlet side of the engine E. The coolants from both channels are mixed at the inlet side of the engine E so that the width of the water temperature hunting gets narrow. And the difference pressure fluctuation becomes small due to the balance of the bypass channel 3 and the radiator R, which results in preventing the overshoot.

The external shape of the cam member 8 supported by the torque shaft 5a is formed so as to conform the flow amount of the coolant passing through the circulation channel 4. It is possible to change the flow amount of the coolant by changing the external shape.

FIGS. 8 and 9 shows the second embodiment of a bypass valve 7' which closes the bypass channel 3 according to the bottom bypass structure of the above explained thermostat device. By adopting the bypass valve 7', it becomes possible to close the bored hole 2a, and since a blocking face 7' a is formed on the bypass valve 7', the bypass channel 3 is also blocked.

The supporting shaft 5b supporting the bypass valve 7 is eccentrically installed into the center hole of the bypass hole 2 bored on the inner peripheral surface of the bottom side 4a of the circulation channel 4 so that a shortest distance is obtained between the supporting shaft 5b and the bypass hole 2a when the blocking face 7a, 7' a of the bypass valve 7, 7' closes the bypass hole 2a.

By installing the supporting shaft 5b in a manner as described above, according to the increase of the turning angles when the bypass valve 7, 7' turns at a predetermined angle, the opening area between the blocking face 7a of the bypass valve 7 and the bypass hole 2*a* can be adjustable by the predetermined turning angle.

Similarly, the opening area between the blocking face 7'*a* of the bypass valve 7' in the above described second embodiment and the inlet of the bypass channel 3 can be also adjustable.

Therefore, by taking this sort of formation, the flow amount of the coolant into the bypass channel 3 can be adjustably controlled without changing the lift characteristics of the thermo-element.

In addition to this sort of adjustable control, the turning force of the supporting shaft 5*b* supporting the bypass valve 7, 7' is not required to be against the flow of the water, so that the thermostat device can be made in a smaller size than that of the conventional poppet type, thereby the effect of water pressure can be reduced and the flow rate control of a small amount of flow can be accurately controlled.

Further, by installing a detecting means such as an angle sensor to the slide valve element 6 or the valve shaft 5 (torque shaft 5*a*, supporting shaft 5*b*) of the bypass valve 7, 7', the opening conditions (opening angle) of the slide valve element 6 and the like can be confirmed from the outside of the thermostat device 1.

By selecting size and material of the bypass valve 7, 7', so that the bypass valves 7, 7' closing the bored hole 2*a* and the bypass channel 3 presses the circulation channel 4*a* in which the bored hole 2*a* and the bypass channel 3 are formed, and a portion of or whole of the wall surface of the case member 2, it may sometimes become possible to avoid or easily adjust leakage of the coolant, flowing from the bored hole 2*a* and the bypass channel 3, at the valve. Thus, it becomes possible for such to properly to correspond according to the circumstances of the place to be used or the situation which exists for the thermostat device 1.

According to the aforementioned bottom bypass structure of the thermostat device of the present invention, the following effects can be expected.

(1) The sensor case having a heat expansion element inside, is structured to be disposed in the circulation channel of the circulating fluid and the slide member is disposed outside the circulation channel of the circulating fluid, thereby avoiding the direct contact of the sliding member of the piston rod and the like with the coolant, resulting in the prevention of trouble such as corrosion of the sliding member by immersion of the coolant or ingredients contained in the coolant. In addition, instead of a poppet valve which has a large water-flow resistance in the circulation channel, a valve having a shaft and turning the valve to perform a flow rate control is provided, thereby permitting a further down sizing of the valve than the size of the poppet valve that is required for obtaining the same amount of the flow rate can be possible. Therefore, it becomes possible to reduce the load an a water pump for sending pressure of the fluid under pressure in the circulation channel, to reduce the size of the radiator, and to reduce the whole device.

(2) Since the coolant in the circulation channel can be directly abutted to the sensor case from the valve element in an open state, by using a valve having a valve shaft and turning the valve shaft to control the flow rate, instead of the poppet valve, the temperature sensibility of the sensor case is improved, and the overshoot and hunting can be prevented by providing the bypass channel, thus enabling to improve the responsibility of the thermostat device and to supply a stable coolant.

(3) Further, since the bypass valve is provided in the bypass channel, it becomes possible to control the flow rate of the bypass channel as well as the flow rate control of the circulation channel. And since reduction of the pressure difference fluctuation and prevention of the water temperature hunting become easier compared with the case without the bypass valve, which results in an accurate flow rate control.

Besides, by altering the position to install the bypass valve or the shape of the bypass valve, it becomes possible to respond to the flow amount increase or decrease without changing the conventional valve element or the case member.

What is claimed is:

1. A thermostat device, which comprises:

a heat expansion element which is expandable and shrinkable upon sensing a temperature change of a circulating fluid in a circulation channel embedded in a case member;

a sliding member:

a thermo-element for causing sliding movement of said sliding member in accordance with expansion and shrinkage of the heat expansion element, said sliding member comprises a first valve element rotatably supported by a valve shaft in the circulation channel, and controlling a flow rate of the circulating fluid by rotation of the valve shaft in accordance with sliding of the thermo-element in order to open or close said valve shaft, said sliding member being disposed outside the circulation channel of the circulating fluid, and a bottom bypass structure in communication with said circulation channel and having a bypass channel for said circulating fluid, said bypass channel being located downstream of said valve element so as to open or close said circulation channel to thereby bypass the circulation fluid to one side of the valve for heat exchange.

2. The bottom bypass structure of the thermostat device according to claim 1, which comprises a second valve element which is supported by said valve shaft of said first valve element valve element and which is operable upon opening and closing of said first valve element.

* * * * *